United States Patent
Seymour

(10) Patent No.: US 7,238,728 B1
(45) Date of Patent: Jul. 3, 2007

(54) COMMERCIAL PRODUCTION OF SYNTHETIC FUEL FROM FIBER SYSTEM

(76) Inventor: Gary F. Seymour, 717 10th Ave NW., Grand Rapids, MN (US) 55744

( * ) Notice: Subject to any disclaimer, the term of this patent is extended or adjusted under 35 U.S.C. 154(b) by 0 days.

(21) Appl. No.: 11/464,086

(22) Filed: Aug. 11, 2006

(51) Int. Cl.
*C07C 27/00* (2006.01)
*C25C 1/10* (2006.01)
*C10L 1/00* (2006.01)

(52) U.S. Cl. .................. 518/700; 518/702; 44/307; 205/629

(58) Field of Classification Search ........... 518/700, 518/702; 44/307; 205/629
See application file for complete search history.

(56) References Cited

U.S. PATENT DOCUMENTS

| | | | |
|---|---|---|---|
| 4,357,146 A | 11/1982 | Heeren | |
| 4,364,743 A | 12/1982 | Erner | |
| 4,863,485 A | 9/1989 | Scafer et al. | |
| 5,416,245 A | 5/1995 | MacGregor et al. | |
| 5,980,595 A | 11/1999 | Andrews | |
| 6,165,238 A | 12/2000 | Parkinson et al. | |
| 6,653,517 B2 | 11/2003 | Bullock | |
| 6,656,343 B2 | 12/2003 | Dancuart | |
| 6,663,752 B2 | 12/2003 | Santilli | |
| 6,709,472 B1 | 3/2004 | Ferretti et al. | |
| 6,756,411 B2 | 6/2004 | Betts et al. | |
| 2005/0000163 A1 | 1/2005 | Dalton | |
| 2005/0154240 A1 | 7/2005 | Myburgh et al. | |
| 2005/0165261 A1 | 7/2005 | Abazajian et al. | |
| 2005/0187415 A1 | 8/2005 | Lawson et al. | |

*Primary Examiner*—J. Parsa

(57) ABSTRACT

A commercial production of synthetic fuel from fiber system for reducing synthetic fuels and other usable by-products from fibrous plant material. The process includes providing wind or solar generated energy to a water electrolysis unit; providing water to said water electrolysis unit; cleaving said water within said water electrolysis unit into hydrogen gas and oxygen gas; supplying said hydrogen gas and said oxygen gas to a hydrogen turbine; providing heat from said hydrogen turbine to a syngas reactor; providing a ground fibrous plant material within said syngas reactor; heating said ground fibrous plant material within said syngas reactor to produce a syngas; separating hydrogen, carbon monoxide, and carbon dioxide from said syngas; inserting said hydrogen, said carbon monoxide, and said carbon dioxide into a Fischer-Tropsch reactor; producing ethanol and methanol within said Fischer-Tropsch reactor; and collecting said mixture of ethanol and methanol produced by said inserting said hydrogen, carbon monoxide, and carbon dioxide into said Fischer-Tropsch reactor.

16 Claims, 4 Drawing Sheets

COMMERCIAL PRODUCTION OF SYNTHETIC FUEL FROM FIBER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to commercial fuel production and more specifically it relates to a commercial production of synthetic fuel from fiber system for producing synthetic fuels and other usable by-products from fibrous plant material.

2. Description of the Related Art

Any discussion of the prior art throughout the specification should in no way be considered as an admission that such prior art is widely known or forms part of common general knowledge in the field.

Commercial fuel synthesis systems have been in use for years. Typically, other systems provide synthesis for waste materials such as plants to be converted into useful gases for energy. Additionally, previous systems have provided for conversion of products such as corn or other useful items into liquid fuels. However, these previous systems did not show the conversion of what are generally considered waste products to be converted into useful products including but not limited to synthetic fuels, fertilizer, and useful gases with little or no emissions being produced from that system. Additionally, the present invention uses renewable power sources as an energy source as opposed to the non-renewable energy sources often used in previous systems.

While these compositions may be suitable for the particular purpose to which they address, they are not as suitable for producing synthetic fuels and other usable by-products from plant material. However, these previous systems did not show the conversion of what are generally considered waste products to be converted into useful products including but not limited to synthetic fuels, fertilizer, and useful gases with little or no emissions being produced from that system.

In these respects, the Commercial Production of Synthetic Fuel From Fiber System according to the present invention substantially departs from the conventional methods of use and compositions of the prior art, and in so doing provides a composition and a method of using the composition primarily developed for the purpose of producing synthetic fuels and other usable by-products from plant material.

BRIEF SUMMARY OF THE INVENTION

In view of the foregoing disadvantages inherent in the known types of commercial fuel production now present in the prior art, the present invention provides a new commercial production of synthetic fuel from fiber system wherein the same can be utilized for producing synthetic fuels and other usable by-products from plant material.

The general purpose of the present invention, which will be described subsequently in greater detail, is to provide a new commercial production of synthetic fuel from fiber system that has many of the advantages of the commercial fuel production mentioned heretofore and many novel features and functions that result in a new commercial production of synthetic fuel from fiber system which is not anticipated, rendered obvious, suggested, or even implied by any of the prior art commercial fuel production, either alone or in any combination thereof.

To attain this, the present invention generally comprises providing wind or solar generated energy to a water electrolysis unit; providing water to said water electrolysis unit; cleaving said water within said water electrolysis unit into hydrogen gas and oxygen gas; supplying said hydrogen gas and said oxygen gas to a hydrogen turbine; providing heat from said hydrogen turbine to a syngas reactor; providing a ground fibrous plant material within said syngas reactor; heating said ground fibrous plant material within said syngas reactor to produce a syngas; separating hydrogen, carbon monoxide, and carbon dioxide from said syngas; inserting said hydrogen, said carbon monoxide, and said carbon dioxide into a Fischer-Tropsch reactor; producing ethanol and methanol within said Fischer-Tropsch reactor; and collecting said ethanol and said methanol produced by said inserting said hydrogen, carbon monoxide, and carbon dioxide into said Fischer-Tropsch reactor.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a commercial production of synthetic fuel from fiber system that will overcome the shortcomings of the prior art.

Another object is to provide a commercial production of synthetic fuel from fiber system that produces synthetic fuels and other usable by-products from plant material.

An additional object is to provide a commercial production of synthetic fuel from fiber system that produces little or no pollutants.

Another object is to provide a commercial production of synthetic fuel from fiber system that uses renewable energy to create an environmentally friendly system.

A further object is to provide a commercial production of synthetic fuel from fiber system that produces fertilizer as a by-product.

Another object is to provide a commercial production of synthetic fuel from fiber system that uses steam reformation to produce synthetic fuel from methane and ethane.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific use illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
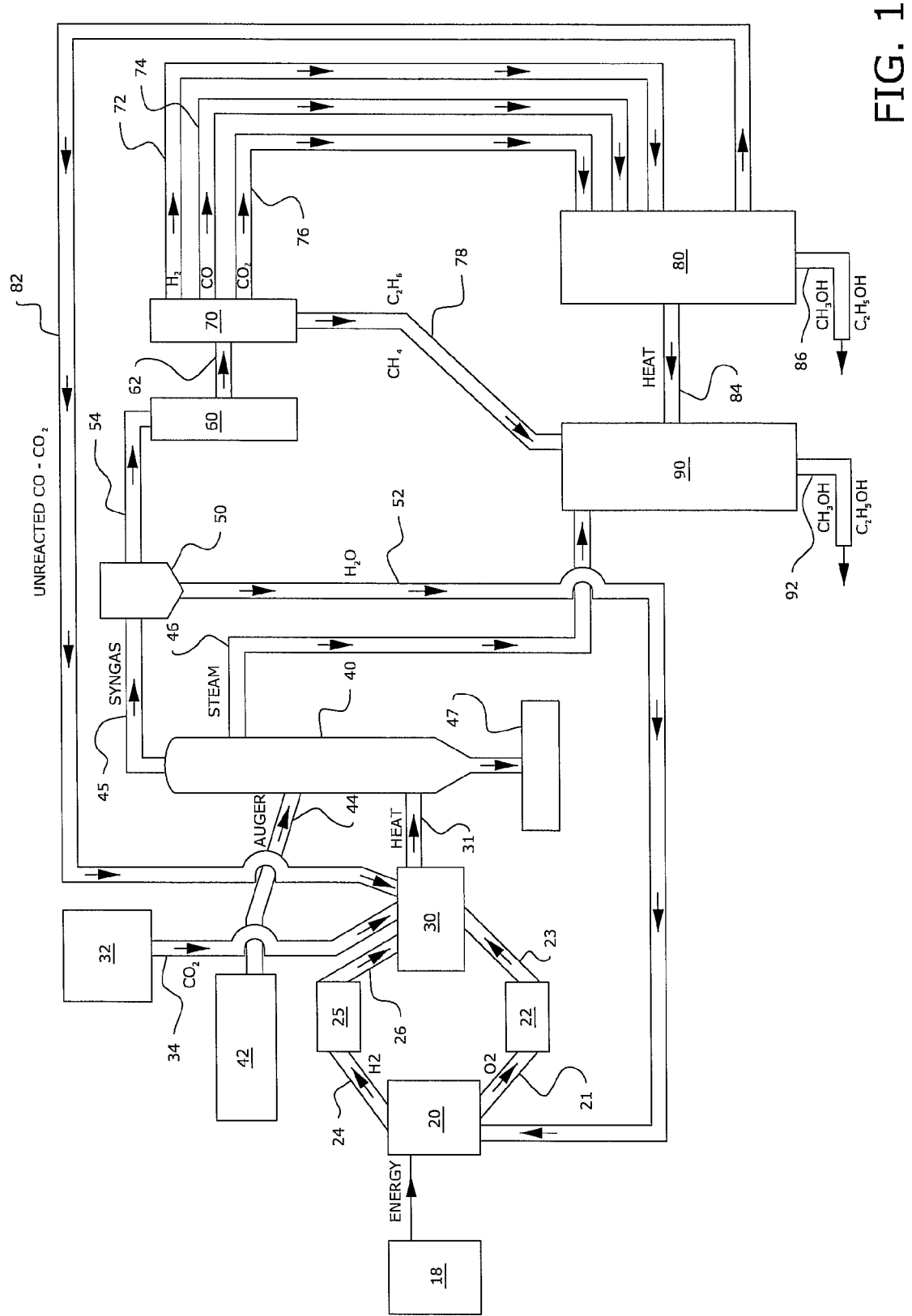
FIG. 1 is a flow diagram of the preferred process of the present invention.

Turning now descriptively to the drawings, in which similar reference characters denote similar elements throughout the several view, FIGS. 1 through 4 illustrate a commercial production of synthetic fuel from fiber system 10, which comprises a commercial production of synthetic fuel from fiber system 10 for reducing synthetic fuels and other usable by-products from fibrous plant material. The composition includes providing wind or solar generated energy to a water electrolysis unit 20; providing water to said water electrolysis unit 20; cleaving said water within said water electrolysis unit 20 into hydrogen gas and oxygen gas; supplying said hydrogen gas and said oxygen gas to a hydrogen turbine 30; providing heat from said hydrogen turbine to a syngas reactor 40; providing a ground fibrous plant material within said syngas reactor 40; heating said ground fibrous plant material within said syngas reactor to produce a syngas; separating hydrogen, carbon monoxide, and carbon dioxide from said syngas; inserting said hydrogen, said carbon monoxide, and said carbon dioxide into a Fischer-Tropsch reactor 80; producing ethanol and methanol within said Fischer-Tropsch reactor 80; and collecting said mixture of ethanol and methanol produced by said inserting said hydrogen, carbon monoxide, and carbon dioxide into said Fischer-Tropsch reactor 80.

A. Power Source

The commercial production of synthetic fuel from fiber system 10 requires an initial power source 18 to drive the processes occruing therein as shown in FIGS. 1-4. This power source 18 is used to split water molecules into hydrogen and oxygen molecules to be used in providing a heat source to the system by using a hydrogen turbine 30. The power source 18 uses solar power or wind generated power to keep the system entirely free of any need for fossil fuels or other processed power source.

B. Water Electrolysis Unit

Figure 2:
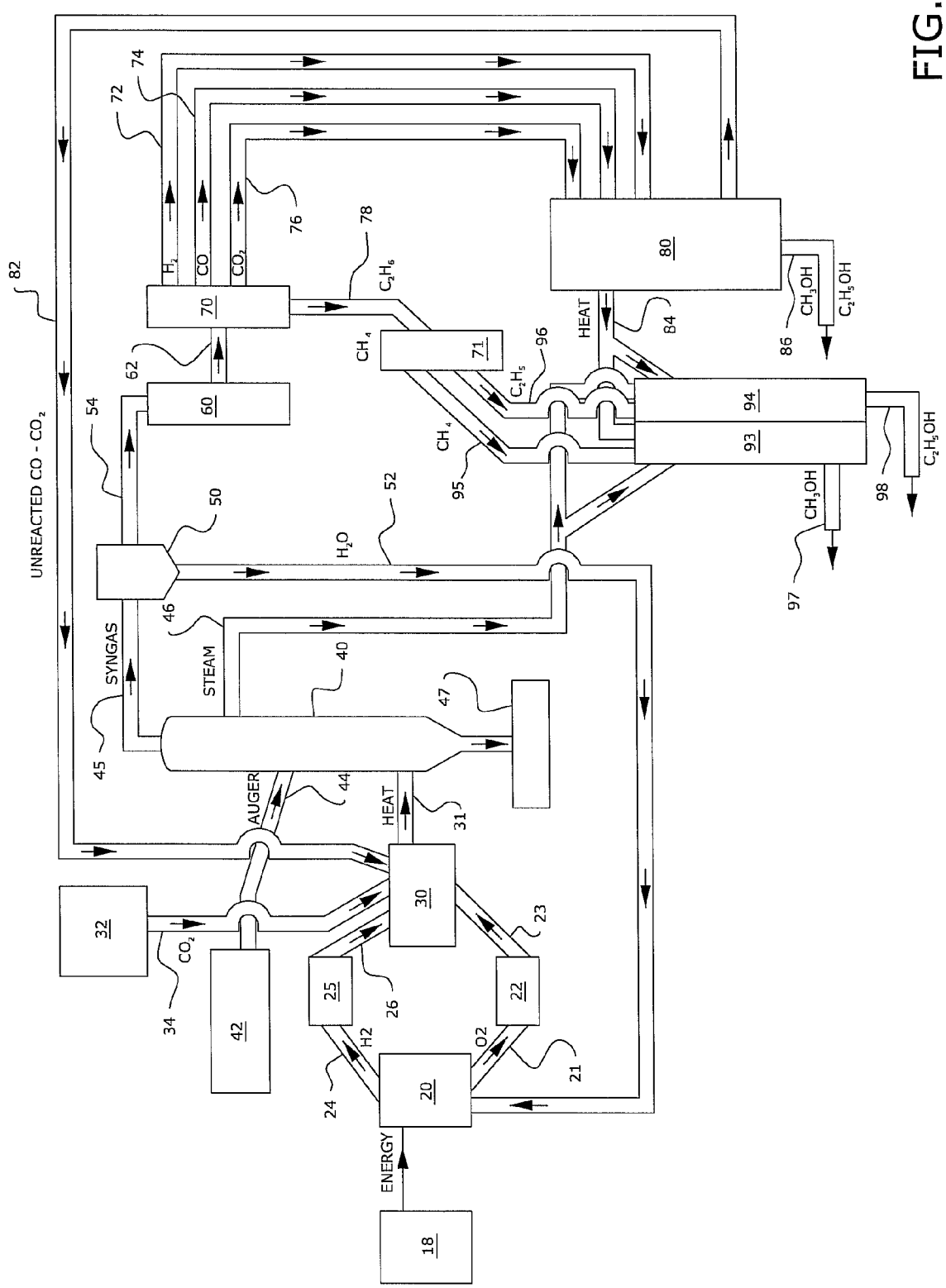
FIG. 2 is a flow diagram of a first alternative embodiment of the present invention, whereby the ethane and methane are separately converted to ethanol and methanol, respectively.
Figure 3:
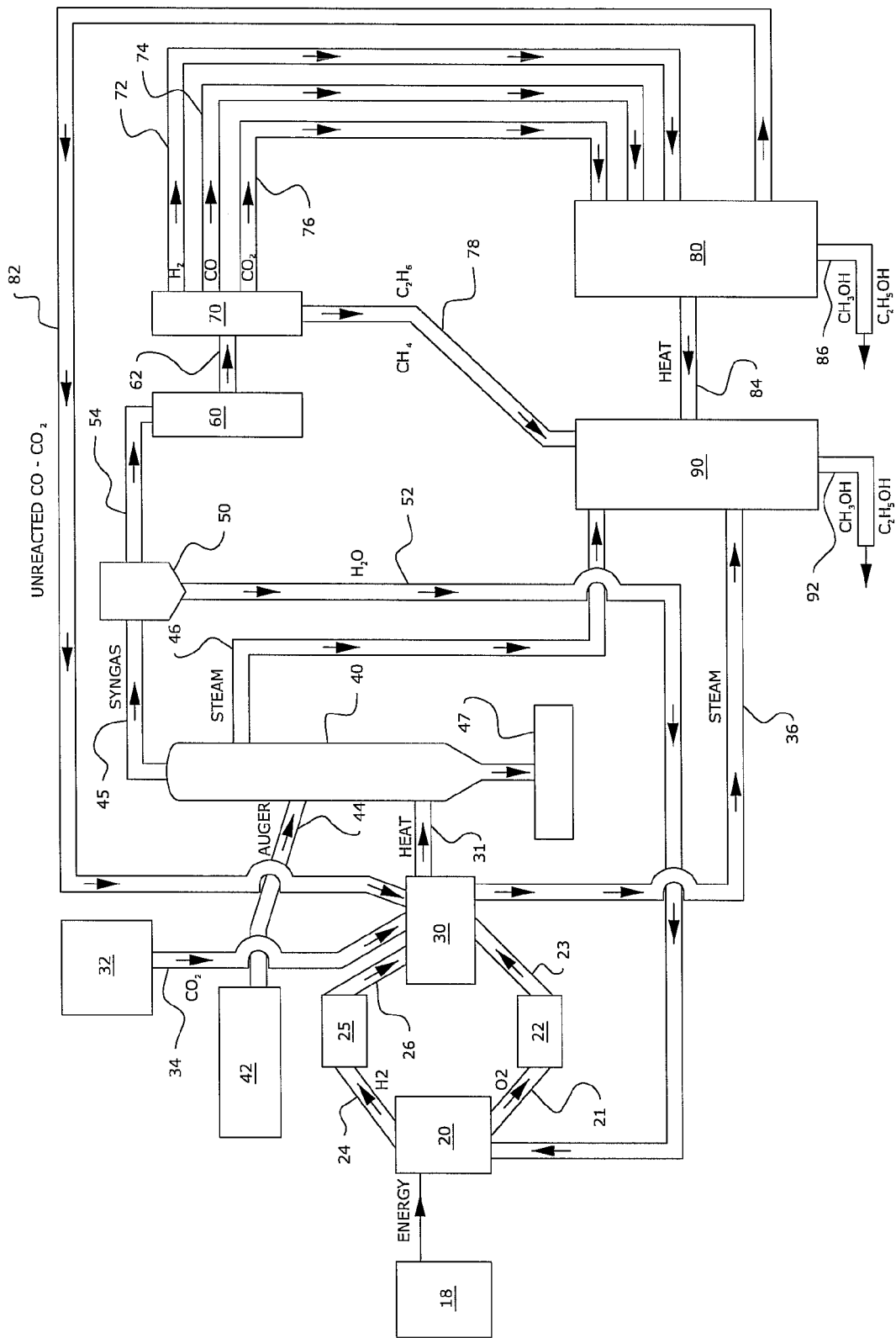
FIG. 3 is a flow diagram of a second alternative embodiment of the present invention whereby excess steam from the hydrogen turbine is used as an additional source of steam for the steam reformation reactor.
Figure 4:
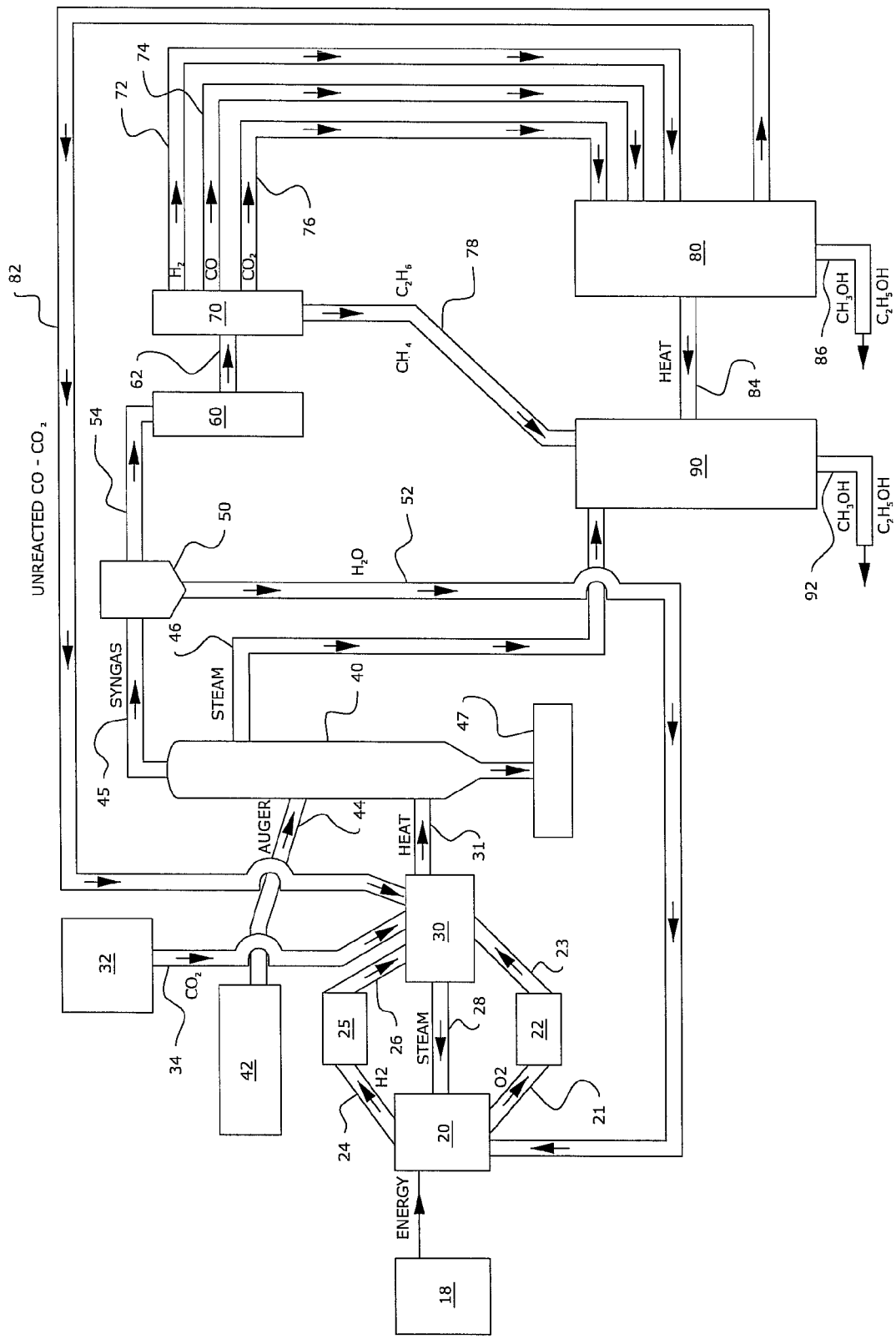
FIG. 4 is a flow diagram of a third alternative embodiment of the present invention whereby excess steam from the hydrogen turbine is used as an additional source of water to be split into hydrogen and oxygen molecules.

The power provided by the power source 18 is then supplied to the water electrolysis unit 20 as shown in FIGS. 1-4. Using power from the power source 18, the water electrolysis unit 20 splits the water molecules found within the water electrolysis unit 20 into hydrogen gas and oxygen gas. The water may be supplied to the water electrolysis unit 20 from water or steam produced in the water condenser 50 as shown in FIGS. 1-4, the hydrogen turbine 30 as shown in FIG. 4, or any other place that water or steam accumulates within the system, including the syngas reactor 40.

The hydrogen gas is diverted, via a hydrogen carrier tube 24, to a hydrogen tank 25 that contains the hydrogen gas produced by the water electrolysis unit 20 as shown in FIGS. 1-4. The hydrogen gas is then supplied, via the hydrogen delivery tube 26, to the hydrogen turbine 30 for production of heat as shown in FIGS. 1-4.

The oxygen gas is diverted, via an oxygen carrier tube 21, to an oxygen tank 22 that contains the oxygen gas produced by the water electrolysis unit 20 as shown in FIGS. 1-4. The oxygen gas is supplied, via an oxygen delivery tube 23, to the hydrogen turbine 30 as shown in FIGS. 1-4.

C. Hydrogen Turbine

The hydrogen turbine 30 is of the type of hydrogen turbine generally used to supply heat by burning hydrogen gas. The hydrogen turbine 30 is used to produce heat for the syngas reactor 40 as shown in FIGS. 1-4. The hydrogen turbine 30 is powered by oxygen and hydrogen produced by the water electrolysis unit 20 as shown in FIGS. 1-4. Additionally, a carbon dioxide tank 32 may be added to the system to maintain an oxygen free combustion zone within the syngas reactor 40. All heat generated in the hydrogen turbine 30 is transferred via a first heat transfer tube 31 to the syngas reactor 40 as shown in FIGS. 1-4.

However, as an alternative embodiment, any excess water molecules and/or steam that are formed in the hydrogen turbine 30 may be supplied back to the water electrolysis unit 20 via a first steam delivery tube 28 as shown in FIG. 4. As an additional alternative embodiment, the steam produced in the hydrogen turbine 30 may be supplied as an additional steam source to the steam reformation reactor 90 as shown in FIG. 3.

D. Syngas Reactor

The syngas reactor 40 provides syngas from heating of a ground fiber feed material. The syngas reactor 40 temperature is preferably between 200 and 2000 degrees Centigrade, and the pressure in the syngas reactor 40 is preferably 20-1000 PSI to allow for proper handling and usage of the contents of the syngas reactor 40. The ground fiber material is supplied by placing fiber material, which may include but is not limited to corn stalks and other agricultural and plant by-products. The fiber material is ground and placed into a feed tank 42, whereby the ground fiber material is transferred to an auger tube 44, which also provides a conduit between the feed tank 42 and the syngas reactor 40 and limits the amount of oxygen that the ground fiber material is exposed to as shown in FIGS. 1-4. In order to further reduce the amount of oxygen within the auger tube 44 and thus the syngas reactor 40, unreacted carbon monoxide and carbon dioxide from the Fischer-Tropsch reactor 80 could be inserted within the auger tube 44 or carbon dioxide in the carbon dioxide feed 34 could also be used in the auger tube 44. A stop cap is also preferably placed on the end of the auger tube that feeds into the syngas reactor 40 to inhibit oxygen from entering the syngas reactor 40 when ground fiber is not being fed into the syngas reactor 40.

As the ground fiber material is fed into the syngas reactor 40, the heat provided by the hydrogen turbine 30 causes (a) syngas (hydrogen, carbon monoxide, carbon dioxide, methane and ethane) to be released into the first syngas delivery tube 45, (b) steam to be released into the third steam delivery tube 46, and (c) the remaining noncombusted solid materials to be released into the fertilizer tank 47 as shown in FIGS. 1-4. The remaining noncombusted solid materials provide a commercially viable fertilizer that can be reused in agricultural or other fertilizer-required industries.

E. Water Condenser

The syngas produced by the syngas reactor 40 is then passed through a water condenser 50 as shown in FIGS. 1-4. The water condenser 40 cools the syngas, allowing excess water molecules intermixed within the syngas to be condensed. The removal of water molecules improves the efficiency of later processes that are less efficient when water molecules are present within the syngas. The water caught by the water condenser 50 is supplied to the water electrolysis unit 20 via the water delivery tube 52 as shown in FIGS. 1-4. After the syngas is passed through the water condenser 50, the syngas is passed into the second syngas delivery tube 54 as shown in FIGS. 1-4.

F. Zinc-Magnesium Column

As a final step of removing excess water from the syngas, the syngas is passed through a zinc-magnesium column 60 as shown in FIGS. 1-4 to remove any leftover water found within the syngas. The magnesium found within the zinc-magnesium column 60 will precipitate any excess water that has passed the water condenser 50. The zinc found within the zinc-magnesium column 60 keeps the carbon monoxide in reduced form and minimize the amount of carbon monoxide that is converted to carbon dioxide when passing the syngas over the zinc-magnesium column 60.

G. Membranes

As shown in FIGS. 1-4, a series of membranes 70, including but not limited to ceramic membranes 70, are utilized in the system to separate the hydrogen gas, carbon monoxide gas, carbon dioxide gas, and ethane and methane from each other within the syngas. The membranes 70 are used to separate the gases in the syngas based upon their molecular weight.

The hydrogen gas separated from the syngas is passed into a second hydrogen delivery tube 72 as shown in FIGS. 1-4. The carbon monoxide gas is passed into a carbon monoxide delivery tube 74 as shown in FIGS. 1-4. The carbon dioxide gas is passed into a carbon dioxide delivery tube 76 as shown in FIGS. 1-4. Any methane and ethane gases present within the syngas are passed into the methane-ethane delivery tube 78 as shown in FIGS. 1-4. The methane and ethane are then sent to a steam reformation reactor 90 whereby a mixture of methanol and ethanol can be produced from the methane and ethane as shown in FIGS. 1, 3 and 4.

As an alternative embodiment, the present invention also has an option of providing a methane-ethane separator 71 attached to the methane-ethane delivery tube 78 as shown in FIG. 2. The methane-ethane separator would most likely be a type of membrane like the membranes 70 to separate the methane and ethane from each other based upon molecular weight. Thus, the methane would be sent to a steam reformation reactor 93 to make methanol and the ethane would be sent to a steam reformation chamber 94 to make ethanol as shown in FIG. 2.

H. Fischer-Tropsch Reactor

The Fischer-Tropsch reactor 80 is used to convert the hydrogen gas, carbon monoxide, and carbon dioxide provided by the hydrogen delivery tube 72, carbon monoxide delivery tube 74 and carbon dioxide delivery tube 74, respectively, into a mixture of methanol and ethanol using Fischer-Tropsch reactors 80 and Fischer-Tropsch processes generally used in the art.

The Fischer-Tropsch reactor 80 causes the hydrogen gas, carbon monoxide, and carbon dioxide to form methanol and ethanol by a synthesis of passing the hydrogen, carbon monoxide, and carbon dioxide over a catalyst, which may include but is not limited to iron or cobalt. The Fischer-Tropsch reactor 80 is an exothermic process, giving off large amounts of heat that is used to power the conversion of methane and ethane into a mixture of methanol and ethanol in the steam reformation reactor 90. The methanol and ethanol produced by the Fischer-Tropsch reactor 80 can be separated from one another via distillation if necessary.

As an alternative embodiment, hydrogen gas can be converted from the Fischer-Tropsch reactor 80 from the hydrogen tank 25 to maintain a stoichiometric balance of hydrogen, carbon dioxide and carbon monoxide within the Fischer-Tropsch reactor 80.

I. Steam Reformation Reactor

A mixture of methanol and ethanol is produced from methane and ethane using a steam reformation reactor 90, wherein the sources of energy and steam are provided by steam from the syngas reactor 40 and heat from the Fischer-Tropsch reactor 80 as shown in FIGS. 1-4. The steam at high pressure and high temperatures reforms the methane and ethane to a mixture of methanol and ethanol. As an alternative embodiment, the steam from the hydrogen turbine 30 can be diverted to the steam reformation reactor 90 as shown in FIG. 3. When methanol and ethanol are produced simultaneously and within the same steam reformation reactor 90, they can be separated from one another via distillation if necessary.

J. Process of Invention

In use, energy is provided from an energy source 18 preferably in the form of solar power or wind generated power. The energy from the energy source 18 is applied to water in a water electrolysis unit 20, thereby cleaving the hydrogen oxygen molecules, and passing the hydrogen gas into a hydrogen tank 25 via a hydrogen carrier tube 24 and the oxygen gas into an oxygen tank 22 via an oxygen carrier tube as shown in FIGS. 1-4.

The hydrogen and oxygen gases are then provided, via a first hydrogen delivery tube 26 and an oxygen delivery tube 23 respectively, to the hydrogen turbine 30, which produces a significant amount of heat that is provided to the syngas reactor 40 via the first heat transfer tube 31. Any excess steam from the hydrogen turbine 30 may be diverted back to the water electrolysis unit 30 as shown in FIG. 4. Carbon dioxide is also preferably fed into the hydrogen turbine 30 from a carbon dioxide source 32 via the carbon dioxide feed 34 as shown in FIGS. 1-4 to maintain an oxygen free combustion in the syngas reactor 40.

The syngas reactor 40 also receives ground fiber material from the feed tank 42 that is passed through an auger tube 44. The auger tube 44 may also be supplied with carbon dioxide to force out any oxygen that may be present in the auger tube 44, thereby making this system relatively oxygen free following hydrogen and oxygen entering the hydrogen turbine 30.

The syngas produced from the syngas reactor 40 is then passed, via a first syngas delivery tube 45, through a water condenser 50 having a cooled environment to condense any water molecules found within the syngas as shown in FIGS. 1-4. The syngas continues through the water condenser 50 via a second syngas delivery tube 54 to the zinc-magnesium column 60. The water molecules are supplied back to the water electrolysis unit 20 and the syngas is passed through a zinc-magnesium column 60 to remove any remaining water molecules found within the syngas as shown in FIGS. 1-4.

From the zinc-magnesium column 60, the syngas is passed into a third syngas delivery tube 62 and through a series of membranes 70, which separate the components of the syngas according to molecular weight. The hydrogen, carbon monoxide and carbon dioxide components are then transferred via a hydrogen delivery tube 72, carbon monoxide delivery tube 74, and carbon dioxide delivery tube 76 respectively, to a Fischer Tropsch reactor 80 as shown in FIGS. 1-4. The methane and ethane components of the syngas are transferred via a methane-ethane delivery tube 78 to a steam reformation reactor 90 as shown in FIGS. 1-4. As an alternative embodiment, the methane and ethane components separated from the syngas may pass through a methane-ethane separator 71 to separate the methane and ethane from one another, which are then each supplied to separate steam reformation reactors 93, 94 via a methane delivery tube 95 and ethane delivery tube 96 respectively, as shown in FIG. 2.

The Fischer-Tropsch reactor 80 takes the hydrogen, carbon monoxide, and carbon dioxide components of the syngas and converts them to ethanol and methanol, which are supplied through a first methanol-ethanol extraction tube 86 as shown in FIGS. 1-4. Since the Fischer-Tropsch process of passing the syngas components across preferably a catalyst, preferably iron or cobalt, is an exothermic reaction, the excess heat is supplied to the steam reformation reactor 90 via the second heat transfer tube 84 as shown in FIGS. 1-4. In addition, any excess unreacted carbon monoxide and carbon dioxide left in the Fischer-Tropsch reactor 80 are supplied to the hydrogen turbine 30 as is shown in FIGS. 1-4. However, it can be appreciated that the excess carbon monoxide and carbon dioxide can be supplied to the carbon dioxide tank 32 to be fed to the hydrogen turbine 30 if excess unreacted carbon monoxide and carbon dioxide is available from the Fischer-Tropsch reactor 80. The ethanol and methanol produced in the Fischer-Tropsch reactor 80 are then extracted from the Fischer-Tropsch reactor 80 via a first methanol-ethanol extraction tube 86 as shown in FIGS. 1-4.

The steam reformation reactor 90 is supplied with the methane and ethane from the membranes 70, the heat from the Fischer-Tropsch reactor 80 and the steam from the syngas reactor 40 to convert the methane and ethane into a mixture of methanol and ethanol as shown in FIGS. 1, 3 and 4. The methanol and ethanol is then extracted from the steam reformation reactor 90 via the second methanol-ethanol extraction tube 92 as is shown in FIGS. 1-4.

As an alternative embodiment, the methane and ethane from the membranes 70 are passed through the methane-ethane separator 71, whereby the methane and ethane are separated from one another and each is supplied to a separate steam reformation reactor 93, 94 supplied by steam from the syngas reactor 40 and heat from the Fischer-Tropsch reactor 80 as is shown in FIG. 2. The steam reformation reactors 93, 94 subsequently convert the methane and ethane into methanol and ethanol respectively, and the methanol and ethanol are extracted separately from each respective steam reformation reactor 93, 94 to the methanol extraction tube 97 and the ethanol extraction tube 98.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A commercial production of synthetic fuel from fiber system, comprising:
   providing wind or solar generated energy to a water electrolysis unit;
   providing water to said water electrolysis unit;
   cleaving said water within said water electrolysis unit into hydrogen gas and oxygen gas;
   supplying said hydrogen gas and said oxygen gas to a hydrogen turbine;
   providing heat from said hydrogen turbine to a syngas reactor;
   providing a ground fibrous plant material within said syngas reactor;
   heating said ground fibrous plant material within said syngas reactor to produce a syngas;
   separating hydrogen, carbon monoxide, and carbon dioxide from said syngas;
   inserting said hydrogen, said carbon monoxide, and said carbon dioxide into a Fischer-Tropsch reactor;
   producing ethanol and methanol within said Fischer-Tropsch reactor; and
   collecting said ethanol and said methanol produced by said inserting said hydrogen, carbon monoxide, and carbon dioxide into said Fischer-Tropsch reactor.

2. The commercial production of synthetic fuel from fiber system of claim 1, wherein said separating step is preceded by condensing water molecules in said syngas by passing said syngas across a water condenser unit.

3. The commercial production of synthetic fuel from fiber system of claim 2, wherein said separating step is preceded by passing said syngas through a zinc-magnesium column.

4. The commercial production of synthetic fuel from fiber system of claim 1, wherein said separating step is preceded by passing said syngas through a zinc-magnesium column.

5. The commercial production of synthetic fuel from fiber system of claim 1, wherein said separating step includes separating methane and ethane from said syngas.

6. The commercial production of synthetic fuel from fiber system of claim 5, wherein said separating step is followed by inserting methane and ethane into a steam reformation reactor.

7. The commercial production of synthetic fuel from fiber system of claim 6, wherein said separating step is followed by supplying heat and steam to said steam reformation reactor to produce a mixture of methanol and ethanol.

8. The commercial production of synthetic fuel from fiber system of claim 7, wherein said syngas reactor produces steam that is supplied to said steam reformation reactor.

9. The commercial production of synthetic fuel from fiber system of claim 8, wherein said hydrogen turbine produces steam that is supplied to said steam reformation reactor.

10. The commercial production of synthetic fuel from fiber system of claim 8, wherein said producing ethanol and methanol within said Fischer-Tropsch reactor provides heat that is supplied to said steam reformation reactor.

11. The commercial production of synthetic fuel from fiber system of claim 1, wherein said Fischer-Tropsch reactor produces heat that is supplied to said steam reformation reactor.

12. The commercial production of synthetic fuel from fiber system of claim 1, wherein said producing step is followed by providing unreacted carbon monoxide and carbon dioxide from said Fischer-Tropsch reactor to said hydrogen turbine.

13. The commercial production of synthetic fuel from fiber system of claim 1, wherein said supplying step is followed by providing steam and water that accumulate in said hydrogen turbine to said water electrolysis unit.

14. The commercial production of synthetic fuel from fiber system of claim 2, wherein said water condensed out of said syngas within said water condenser is supplied to said water electrolysis unit.

15. The commercial production of synthetic fuel from fiber system of claim 1, wherein said syngas reactor is operated at pressures between 20 and 1000 PSI.

16. The commercial production of synthetic fuel from fiber system of claim 1, wherein said syngas reactor is operated at temperatures between 20 and 2000 degrees Centigrade.

* * * * *